United States Patent [19]

Neugent

[11] Patent Number: 5,040,709
[45] Date of Patent: Aug. 20, 1991

[54] WATER BOTTLE AND CAGE FOR A BICYCLE

[76] Inventor: John J. Neugent, 20751 Circulo Durango, Yorba Linda, Calif. 92686

[21] Appl. No.: 488,893

[22] Filed: Mar. 5, 1990

[51] Int. Cl.⁵ .............................................. B62J 11/00
[52] U.S. Cl. .................................... 224/35; 224/32 R; 224/39; 248/311.2; 220/85 H
[58] Field of Search ...................... 224/35, 32 R, 30 R, 224/39, 37, 38; 220/85 H, 320, DIG. 13; 215/1 C, 1 R; 248/311.2, 313

[56] References Cited

U.S. PATENT DOCUMENTS

| 2,684,221 | 7/1954 | Wollam | 248/27 |
| 3,144,232 | 8/1964 | Smootz | 248/141 |
| 4,009,810 | 3/1977 | Shook | 224/39 |
| 4,437,596 | 3/1984 | Shook | 224/39 |
| 4,830,239 | 5/1989 | Tackles et al. | 234/35 |
| 4,880,133 | 11/1989 | Cullinane | 220/85 H |

FOREIGN PATENT DOCUMENTS 1158258  6/1958  France ............................ 248/313

Primary Examiner—Linda J. Sholl
Attorney, Agent, or Firm—Poms, Smith, Lande & Rose

[57] ABSTRACT

An articulated expandable cage for a bicycle water bottle includes two clamp parts, of which one can be pivoted and displaced with respect to the other to enlarge the clamp opening for reception of the oversize bottom of a bottle having an intermediate section that is snugly received by the clamp when the two clamp parts are moved together. The oversize bottle bottom is too large to pass through the closed clamp opening, but the bottle can be removed by tilting it to pivotally and translationally separate the two clamp parts against the action of a closing spring.

21 Claims, 2 Drawing Sheets

WATER BOTTLE AND CAGE FOR A BICYCLE

BACKGROUND OF THE INVENTION

The present invention relates to a water bottle and cage for mounting to a bicycle frame member, and more particularly concerns a cage and bottle combination that will securely lock the bottle to the cage while permitting ready attachment and detachment of the bottle from the cage.

Various bicycle accessories, including water bottles, are desirably carried with the rider, affixed to the bicycle. Generally such items as a water bottle are mounted in a wire or skeletal frame or cage, which itself is fixed to a frame member of the bicycle. Bottle cages such as shown in the U.S. Pat. Nos. to William Shook, 4,437,596 and 4,009,810, and in the patent to Tackles et al, 4,830,239, employ cage elements that are resiliently bent to allow insertion and removal of the water bottle, but no positive locking arrangement is employed.

Particularly for a type of bicycle, including that known as a mountain bike, that is designed for use over rough terrain, vibration to which the bicycle is subjected makes the common resilient water bottle cages unreliable. This is because shock and vibration experienced in riding over rough terrain may shake the bottle and dislodge it from the cage. Thus it often happens that in traversing certain types of rough terrain a rider will lose the water bottle.

Accordingly, it is an object of the present invention to provide a water bottle and cage for holding the bottle to a frame member which avoid or minimize above mentioned problems.

SUMMARY OF THE INVENTION

In carrying out principles of the present invention in accordance with a preferred embodiment thereof a cage for holding a water bottle to a bicycle comprises a cage spine adapted to be secured to a bicycle frame and a bottle clamp mounted on the spine and defining a bottle opening for receiving and encircling a bottle. The clamp includes a first part mounted to the spine and a second part mounted to the first part for motion between a closed position in which the clamp parts define a bottle opening of a relatively smaller size to snugly receive and encircle the bottle and a second or insertion position in which the parts are displaced relative to one another to define an enlarged opening that will allow insertion of an oversized bottom end of the bottle. A bottle for use with this cage has an intermediate section of a size to be snugly received and held by the clamp parts in their close position and has an enlarged bottom section that cannot pass through the clamp in the closed clamp position but will readily pass through the clamp when the parts are relatively displaced.

DETAILED DESCRIPTION OF THE INVENTION

Figure 1:
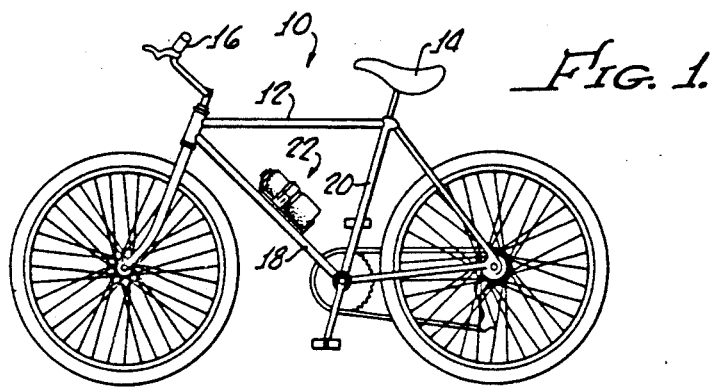
FIG. 1 illustrates a bicycle having a bottle and bottle cage of the present invention affixed thereto.

As illustrated in FIG. 1, a bicycle 10 is formed with a conventional frame made of rigid tubular members including an upper horizontal tubular member 12 extending between bicycle seat 14 and handlebars 16. An inclined frame member 18 extends between the bicycle front fork and the lower end of the rear upright tubular frame member 20. Secured to the inclined frame member 18 is a water bottle and cage assembly 22 embodying principles of the present invention. It will be readily appreciated that the cage and bottle can be secured to other frame members, as desired.

Figure 2:
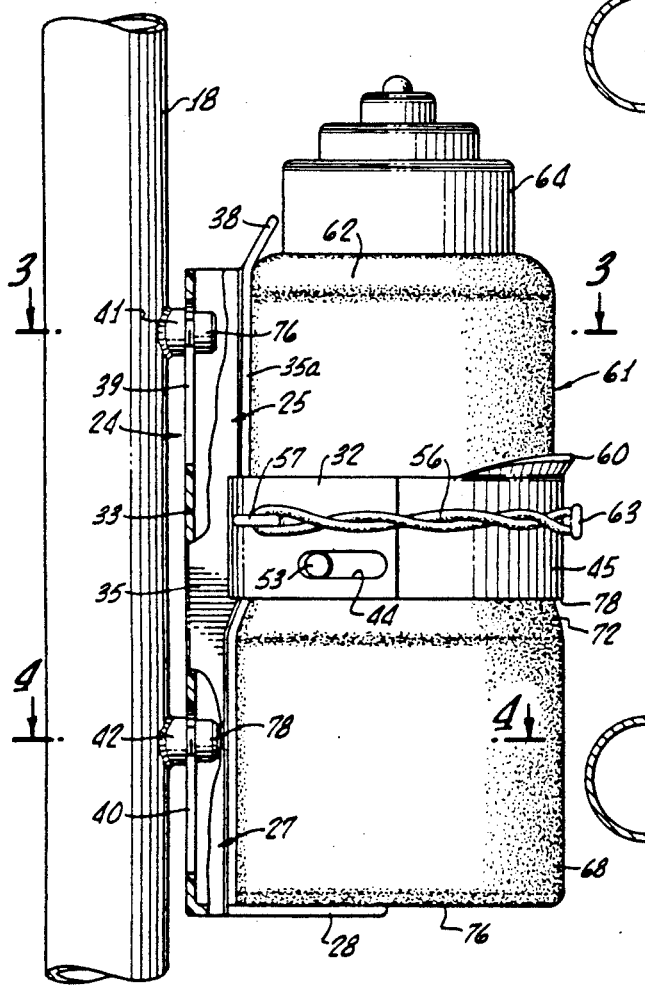
FIG. 2 is a side view of the cage and bottle secured to a bicycle frame member.
Figure 3:
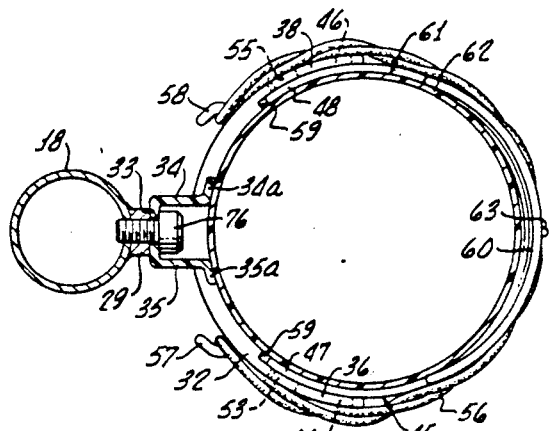
FIG. 3 is a section taken on lines 3—3 of FIG. 2.
Figure 4:
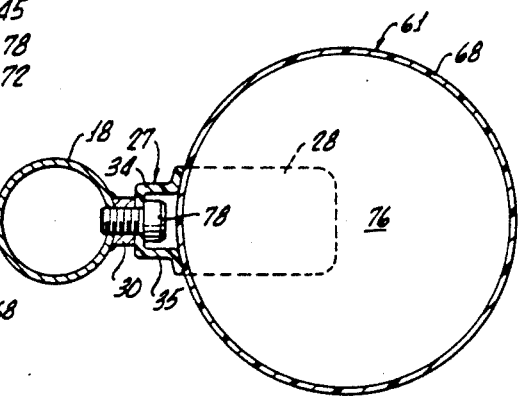
FIG. 4 is a section taken on lines 4—4 of FIG. 2.
Figures 5, 6:
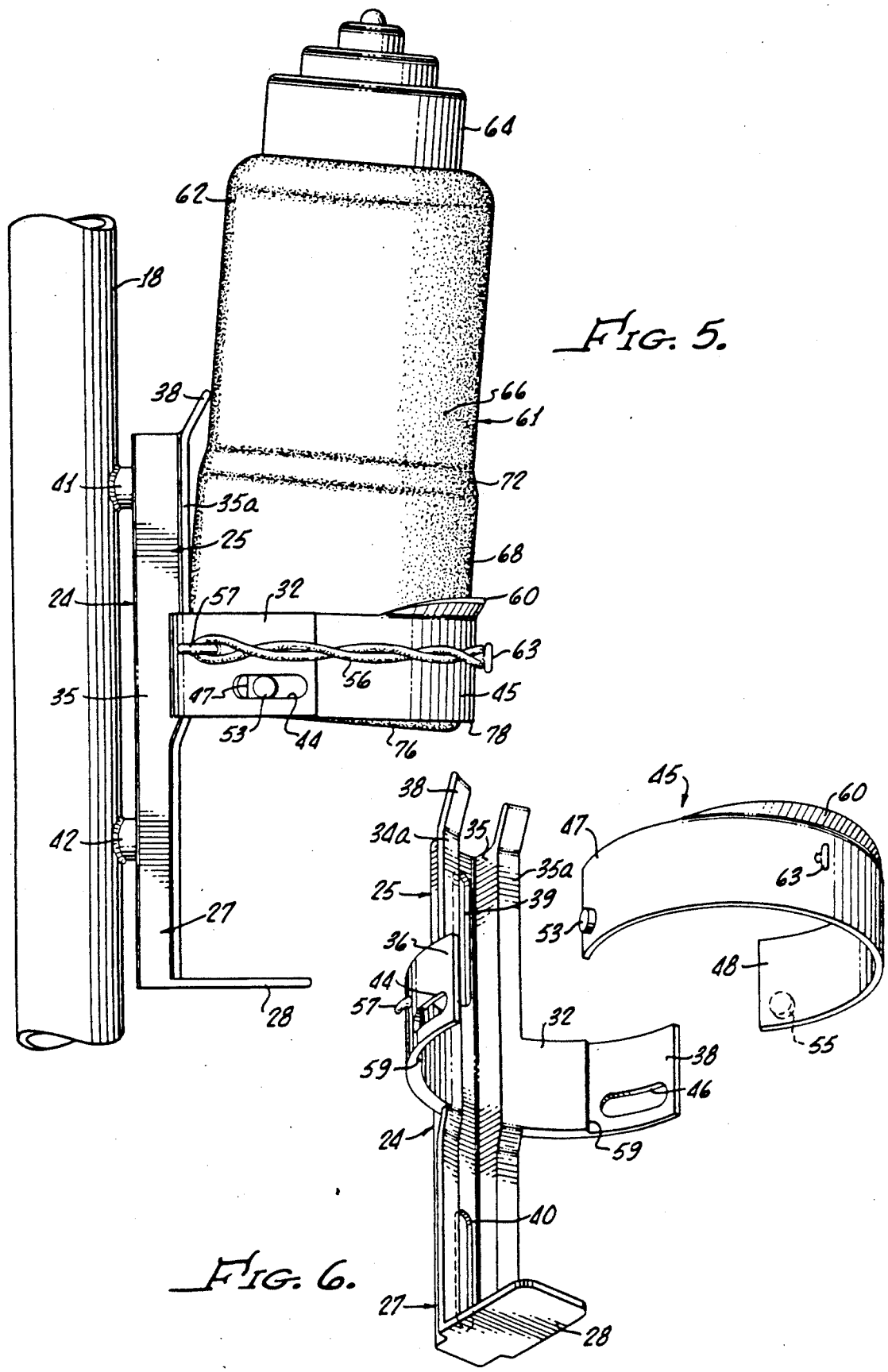
FIG. 5 illustrates the clamp parts in relatively displaced position as a bottle is being inserted.
FIG. 6 is an exploded pictorial view of a bicycle bottle cage embodying principles of the present invention.

As shown in FIGS. 2 and 6, a bottle cage 24 includes a two part, strong, rigid post having upper and lower post sections 25,27 forming a cage spine and having an integral cage bottom 28 secured to a lower end of the lower section 27 and extending transversely for a distance from the spine. A first substantially semicircular clamp section 32 is fixedly secured, at an intermediate portion thereof between its ends 36,38 to and between the lower end of post section 25 and the upper end of post section 27. Each post section has the same somewhat channel shaped cross section, as best seen in FIGS. 3 and 4, with a web 33 interconnecting channel sides 34,35 to which are integrally secured laterally extending flanges 34a, 35a respectively. The upper end 38 of the web of post section 25 is inclined upwardly and radially inwardly to contact and position an upper end of a bottle mounted in the cage. The web of each post section is formed with a slot 39,40 to receive threaded studs 41,42 welded to the tubular frame member 18 and receiving nuts 76,78 to securely fix the cage 24 to the bicycle frame.

Lower portions of clamp section 32, that is those portions that are closer to low post section 27, are formed with oppositely disposed circumferentially extending slots 44,46 which extend for a short distance circumferentially from a point just inwardly of the clamp section ends. End portions 36,38 of clamp section 32 have less thickness than the intermediate portion of the clamp section to form inwardly stepped ends, defining shoulders 59 (FIG. 6) that receive ends of a second movable clamp section 45.

The second clamp section is substantially semicircular and mates with fixed clamp section 32. It has its free end portions 46,48 received within the open ends of clamp section 32, in overlapping relation with the thinner end portions 36,38. Thickness of clamp section 45 is less than the thickness of the thicker intermediate portion of clamp section 32. The configuration and thickness of the clamp sections is such that when the two clamp sections are mated, as shown in FIGS. 2 and 3, the inner surface of clamp section 45 forms a smooth continuation of the inner surface of the intermediate portion of clamp section 32 to provide a smooth, continuous, circularly cylindrical inner surface of the combined clamp sections.

Fixedly secured to free end portions 47,48 of clamp section 45 diametrically opposite are fixed short, radially outwardly projecting pivot pins 53,55. Pins 53,55 are received in slots 44 and 46, respectively, and thus connect the movable clamp section 45 to the fixed clamp section 32 for relative pivotal and translational motion. That is, the movable clamp section 45 may pivot relative to the clamp section 32 about the mutually aligned axes of pivot pins 53,55, and the movable clamp section, together with the pins, may also move radially outwardly relative to the fixed clamp section 32 by motion of the pins along the lengths of the slots 44,46.

A resilient member, such as a twisted, endless elastic band 56 (an O-ring may be employed), holds the two clamp sections together. Clamp section 32 has a pair of oppositely disposed outwardly and rearwardly projecting fixed hooks 57,58 that extend through the ends of band 56 to secure the band ends to opposite sides of clamp section 32. The elastic band 56 is resiliently stretched to extend around the clamp section 45 and thus strongly urges the two clamp sections to the closed position illustrated in FIG. 2, wherein the free ends of the two clamp sections are in mutual overlapping engagement and the free end edges of clamp section 45 abut the shoulders 59 formed at the junction of the thicker and thinner portions of clamp section 32. Band 56 is held in place on clamp section 45 by engagement with a bi-directional or two pronged hook 63 fixed to a forward portion of clamp section 45.

At the upper side of movable clamp section 45 is an upwardly and outwardly extending lip 60 that provides a camming lip or abutment by means of which the movable clamp section 45 may be pivoted and displaced from the fixed clamp section. Lip 60 tapers from a maximum extension at the forward or intermediate portion of clamp section 45 to a much smaller extension near the ends 47,48 of the movable clamp section.

As shown in FIGS. 2 and 5, a water bottle 61 particularly arranged to be used with the cage 24 has a circular cross section and includes an upper section 62, having a conventional cap 64, an intermediate section 66 and an oversized or enlarged bottom section 68. The increased size of the bottom section may be of many different configurations, such as radially projecting lips, circumferentially extending and radially outwardly projecting ribs or other configurations. Conveniently it is presently preferred to simply enlarge the diameter of the lower section, so that the upper and intermediate sections have one diameter and the lower section has a different and larger diameter Thus the bottom section extends laterally outwardly relative to the intermediate section, over its entire circumference. The enlarged bottom section 68 connects to the intermediate section 66 by means of a tapered transition area 72 that extends continuously around the bottle. With the clamp sections in the closed position illustrated in FIG. 2 and held in such position by the urging of the elastic band 56, the clamp sections form a substantially circular clamp opening having a smooth circularly cylindrical inner surface with a diameter that is substantially equal to the smaller external diameter of the intermediate section 66 of the bottle. The diameter of the clamp opening in unstressed closed position (without a bottle within the clamp) may be slightly less than the diameter of bottle section 66 to ensure a tighter grip of the clamp upon the bottle.

To insert the bottle into the clamp, the bottle is slightly tilted so that its axis is inclined to the longitudinal extent of the cage spine, as shown in FIG. 5, and a forward lower corner of the enlarged bottom section 68 of the bottle is inserted into the relatively small closed opening of the closed clamp sections, with a side of the enlarged bottom section 68 of the bottle resting against the camming lip 60. The bottle in this position is then pressed downwardly substantially along the axis of the clamp to cause the enlarged lower section of the bottle to press against the camming lip 60 to effect a small amount of pivotal motion of the movable clamp section 45 about the pivot pins 53,55 and concomitantly to radially shift the movable clamp section outwardly to a position such as that illustrated in FIG. 5. With the movable clamp section slightly pivoted and shifted radially outwardly, the clamp opening is now enlarged sufficiently to permit the oversized bottom section of the bottle to pass through the clamp opening between the clamp sections. This allows the bottom 76 of the bottle to be positioned snugly against the cage bottom 28. With the bottle fully inserted into the clamp sections, as shown in FIG. 2, the uppermost end of transition area 72 of the enlarged bottom section is positioned at or just below the lower edge 78 of clamp section 45 and just at or below the lower edge 80 of the fixed clamp section so that all of the enlarged lower section of the bottle is now just below the clamp. Thus as soon as the transition section 72 moves below the lower edge of the clamp sections, movable section 45 is free to move, under the urging of elastic band 56, back toward it closed position. When the enlarged bottom section passes the lower edges of the two clamp sections, the latter snap together under the urging of band 56 and the bottle is locked in the clamp. In this position the clamp sections closely and snugly encircle the intermediate section 66 of the bottle above the enlarged lower portion 68. The bottle is now securely and firmly locked in place within the cage because the enlarged bottom portion of the bottle cannot pas through the smaller opening of the two clamp sections.

The two cage post sections 25,27 are offset from one another in a direction extending radially of the clamp so that when the bottle is locked to the cage in the closed clamp position, the upper post section 25 will directly abut, extend along and support upper and intermediate sections of the bottle and the lower post section will directly abut, extend along and support the enlarged lower section of the bottle, which rests against the flanges of the post section. To achieve this relative offset, the lower end of upper post section 25 is connected to a radially inner portion of the upper edge of clamp section 32 whereas the upper and of lower post section 27 is connected to a radially outer portion of the lower edge of clamp section 32. The two post sections extend in parallel directions, but the lower post section is radially outwardly displaced relative to the upper post section by an amount substantially equal to the difference in diameters of intermediate and lower sections of the bottle. The cage may be formed of a suitable strong, rigid plastic with the two post sections molded integrally to each other and to the fixed clamp section.

To remove the bottle from the clamp it is only necessary to grasp the upper portion of the bottle and to tilt it outwardly away from the cage spine while simultaneously pulling the bottle upwardly, substantially along the axis of the clamp. This pivots clamp section 45 and causes the tapered transition area 72 to cam the clamp section 45 outwardly. Thus, removal of the bottle is accomplished by pivotally and translationally moving the clamp section 45, using the leverage afforded by the length of the bottle to move clamp section 45 against the closing force of band 56. Pivotal motion of the clamp section is accomplished by pulling the upper portion of the bottle radially outwardly, while the translational displacement of the movable clamp section is accomplished by simultaneously pulling the bottle upwardly, to thereby cause the tapered transition area 72 to cam the clamp section 45 outwardly.

The cage post sections are fixed to the bicycle frame member 15 by means of nuts 76,78 which are larger than the width of slots 39,40 and are threadedly fixed to the fixed threaded studs 41,42 that extend through the slots.

Although the upper end 38 of post section 38 is shown as extending over and helping to lock an upper end of the bottle, it will be appreciated that the parts may be differently proportioned so that the bottle is longer than the cage and the inwardly bent cage end 38 engages an intermediate portion of the bottle. Such intermediate portion of this longer bottle has a circumferential groove to accept the bent locking end 38 of the cage and help to lock the bottle.

A bottle and clamp of circular cross section have been shown, and are presently preferred. However, it will readily be appreciated that other, non-circular, cross sections of bottle and clamp may be employed.

It will be seen that the movable cage sections, together with the oversized bottom bottle, cooperate to securely and firmly lock the bottle to and within the cage and prevent inadvertent displacement, even over long periods of use of the bicycle in extremely rugged terrain. Motion, shock and vibration of the bicycle will not inadvertently dislodge the bottle from the cage. However, the bottle still may be easily removed from the cage when desired without the use of any tools, screws or manipulation of any type of fastener means. The bottle itself provides the means for locking it within the clamp and also forms the tool (the bottle itself is a lever) that facilitates displacement of clamp section 45 to enable removal of the bottle.

I claim:

1. A cage for holding a water bottle to a bicycle comprising:
   a cage spine adapted to be secured to a bicycle frame, and
   a bottle clamp mounted on said spine and defining a bottle opening extending along a clamp axis for receiving and holding a bottle, said clamp forming a band extending continuously in a plane transverse to said clamp axis and comprising:
   a first clamp part mounted to said spine,
   a second clamp part mounted to said first clamp part for motion between a closed position in which the clamp parts define a bottle holding opening of a predetermined size to snugly receive and continuously transversely encircle a bottle, and an insertion position in which said second clamp part is displaced relative to said first clamp part to define an enlarged opening at at least one end of said clamp that is larger than said bottle holding opening, and
   means for holding said clamp parts in said closed position, whereby a bottle that is tilted relative to said clamp axis may be inserted into said clamp to enlarge said holding opening and move said second clamp part to said second position, and whereby the bottle may be aligned with said clamp axis after insertion and after said second clamp part is returned to said first position, said clamp parts defining a continuous band in both closed and insertion positions, that is adapted to completely and continuously encircle a bottle in a transverse plane.

2. The apparatus of claim 1 wherein said second clamp part is pivotally connected to said first clamp part.

3. The apparatus of claim 1 wherein said second clamp part is connected to said first clamp part for pivotal and translational displacement.

4. A cage for holding a water bottle to a bicycle comprising:
   a cage spine adapted to be secured to a bicycle frame, and
   a bottle clamp mounted on said spine and defining a bottle opening extending along a clamp axis for receiving and holding a bottle, said clamp comprising:
   a first clamp part mounted to said spine,
   a second clamp part mounted to said first clamp part for motion between a closed position in which the clamp parts define a bottle holding opening of a predetermined size to snugly receive and encircle a bottle, and an insertion position in which said second clamp part is displaced relative to said first clamp part to define an enlarged opening at at least one end of said clamp that is larger than said bottle holding opening,
   means for holding said clamp parts in said closed position, whereby a bottle that is tilted relative to said clamp axis may be inserted into said clamp to enlarge said holding opening and move said second clamp part to said second position, and whereby the bottle may be aligned with said clamp axis after insertion and after said second clamp part is returned to said first position, and,
   a cage bottom connected to and extending from said cage spine, said second clamp part being pivotally connected to said first clamp part about an axis transverse to said clamp axis and adjacent an end of said clamp that is closer to said cage bottom.

5. A cage for holding a water bottle to a bicycle comprising:
   a cage spine adapted to be secured to a bicycle frame, and
   a bottle clamp mounted on said spine and defining a bottle opening extending along a clamp axis for receiving and holding a bottle, said clamp comprising:
   a first clamp part mounted to said spine,
   a second clamp part mounted to said first clamp part for motion between a closed position in which the clamp parts define a bottle holding opening of a predetermined size to snugly receive and encircle a bottle, and an insertion position in which said second clamp part is displaced relative to said first clamp part to define an enlarged opening at at least one end of said clamp that is larger than said bottle holding opening, and
   means for holding said clamp parts in said closed position, whereby a bottle that is tilted relative to said clamp axis may be inserted into said clamp to enlarge said holding opening and move said second clamp part to said second position, and whereby the bottle may be aligned with said clamp axis after insertion and after said second clamp part is returned to said first position,
   said second clamp part being connected to said first clamp part for pivotal and translational displacement, said means for holding comprising a resilient band extending between said clamp parts.

6. A cage for holding a water bottle to a bicycle comprising:
a cage spine adapted to be secured to a bicycle frame, and
a bottle clamp mounted on said spine and defining a bottle opening extending along a clamp axis for receiving and holding a bottle, said clamp comprising:
a first clamp part mounted to said spine,
a second clamp part mounted to said first clamp part for motion between a closed position in which the clamp parts define a bottle holding opening of a predetermined size to snugly receive and encircle a bottle, and an insertion position in which said second clamp part is displaced relative to said first clamp part to define an enlarged opening at at least one portion of said clamp that is larger than said bottle holding opening, and
means for holding said clamp parts in said closed position, whereby a bottle that is tilted relative to said clamp axis may be inserted into said clamp to enlarge said holding opening and move said second clamp part to said closed position, and whereby the bottle may be aligned with said clamp axis after insertion and after said second clamp part is returned to said first position,
comprising a first substantially semicircular clamp section and said second clamp part comprising a second substantially semicircular clamp section having first and second ends mating with the first and second ends of said first clamp section respectively in closed position, first pin and slot means connecting the first end of said first clamp section with the first end of said second clamp section, second pin ;and slot means for connecting the second end of said first clamp section with the second end of said second clamp section, whereby said second clamp section is movable both pivotally and translationally with respect to said first clamp section.

7. A cage and bottle assembly comprising the apparatus of claim 8 and including a bottle extending through said clamp sections, said bottle having an intermediate section with an external configuration and dimension substantially the same as the configuration and dimension of the holding opening formed by said first and second clamp sections in said closed position, said bottle having an enlargement below said intermediate section that defines a bottle dimension greater than the dimension of said holding opening.

8. The assembly of claim 7 wherein said pin and slot means are positioned adjacent one end of said clamp, and said means for holding comprises a resilient band extending at least partly around the other end of said clamp.

9. A bicycle water bottle and holding cage therefor comprising:
a cage spine,
a cage bottom secured to and extending transversely from a bottom end of said spine,
a first clamp section fixed to an intermediate portion of said spine and spaced from said cage bottom,
a second clamp section,
means for interconnecting said first and second clamp sections for mutual radial motion relative to one another between a closed position in which the clamp sections are mutually juxtaposed to define a holding opening having a first diameter, and an insertion position in which the clamp sections are mutually displaced to define an insertion opening larger than said holding opening,
means for releasably holding said clamp sections in said closed position, and
a water bottle received in said holding opening between said first and second clamp sections, said water bottle having:
an intermediate section received in and snugly engaged by said first and second clamp sections in said closed position, said intermediate section having a diameter substantially equal to said first diameter, and
a bottom section adjacent said cage bottom, said bottom section having a diametral dimension larger than the diameter of said intermediate section and larger than said first diameter, and being received in said cage between said clamp sections and said cage bottom
said clamp sections collectively forming a continuous transverse band that completely and continuously transversely encircles said bottle in said closed and insertion positions of said clamp.

10. The apparatus of claim 9 wherein said means for interconnecting comprises means for connecting said sections for relative pivotal and translational motion.

11. The apparatus of claim 9 wherein said means for interconnecting comprises pin and slot means connecting said first and second clamp sections to one another at portions of said clamp sections that are closer to said cage bottom, whereby said second clamp section may be pivotally and translationally displaced from said first clamp section by pivoting the second clamp section about said pin and slot means and radially moving said second clamp section radially outwardly of said first clamp section.

12. The apparatus of claim 11 wherein said means for holding comprises a resilient member extending at least partly around a portion of said clamp sections that are further form said cage bottom.

13. The apparatus of claim 9 wherein said cage spine comprises an upper post section fixed to an upper end of said first clamp section, and a lower post section fixed to a lower end of said first clamp section, said lower post section being radially outwardly displaced relative to said upper post section.

14. A bicycle bottle holding cage comprising:
a cage spine;
a cage bottom secured to and extending transversely from a bottom end of said spine,
a first clamp section fixed to an intermediate portion of said spine and spaced from said cage bottom,
a second clamp section,
means for interconnecting said first and second clamp sections for mutual radial motion relative to one another between a closed position in which the clamp sections are mutually juxtaposed to define a holding opening having a first diameter, and an insertion position in which the clamp sections are mutually displaced to define an insertion opening larger than said holding opening, said clamp sections collectively defining a continuous transverse bottle holding band adapted to continuously encircle a bottle in said cage when said clamp sections are in at least said closed position, and means for releasably holding said clamp sections in said closed position.

15. The apparatus of claim 14 wherein said means for interconnecting comprises means for connecting said sections for relative pivotal and translational motion.

16. The apparatus of claim 14 wherein said means for interconnecting comprises pin and slot means connecting said first and second clamp sections to one another at portions of said clamp sections that are closer to said cage bottom, whereby said second clamp section may be pivotally and translationally displaced from said first clamp section by pivoting the second clamp section about said pin and slot means and radially moving said second clamp section radially outwardly of said first clamp section.

17. The apparatus of claim 14 wherein said means for holding comprises a resilient member extending at least partly around a portion of said clamp sections that are further from said cage bottom.

18. The apparatus of claim 14 wherein said cage spine comprises an upper post section fixed to an upper end of said first clamp section, and a lower post section fixed to a lower end of said first clamp section, said lower post section being radially outwardly displaced relative to said upper post section.

19. The bicycle bottle holding cage of claim 14 wherein said first and second clamp sections comprise mutually independent and separate sections having section ends, the ends of said first section being closely adjacent the ends of said second section, said means for interconnecting comprising slot means formed in one of the ends of one of said sections and connecting means formed in a corresponding end of the other of said sections and movably received in said slot means.

20. A cage for holding a bottle to a bicycle comprising:
a cage spine adapted to be secured to a bicycle frame
a continuous band clamp mounted on the spine and defining a bottle opening having an axis extending along a clamp axis which is substantially parallel to the spine, said band clamp extending continuously in a plane transverse to the clamp axis and comprising first and second clamp parts interconnected to one another for relative movement to enable said bottle opening to be enlarged by displacement of one clamp part from another, said band clamp forming a substantially continuous band adapted to completely encircle a bottle to be held therein and to provide ;a continuous bottle encircling band throughout a range of relative positions of said clamp parts, and
means for urging said clamp parts toward each other so as to decrease the size of said bottle opening.

21. The cage of claim 10 wherein said first clamp part has first and second ends and wherein said second clamp part has third and fourth ends, slot means formed in said first end and a connecting member formed on said third end, said connecting member projecting into and slidably received in said slot means.

* * * * *